(12) United States Patent
Kataoka

(10) Patent No.: US 9,476,545 B2
(45) Date of Patent: Oct. 25, 2016

(54) PRESSURE VESSEL

(71) Applicant: Kobe Steel, Ltd., Kobe-shi (JP)

(72) Inventor: Yasuto Kataoka, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 92 days.

(21) Appl. No.: 14/397,277

(22) PCT Filed: Jun. 13, 2013

(86) PCT No.: PCT/JP2013/003722
§ 371 (c)(1),
(2) Date: Oct. 27, 2014

(87) PCT Pub. No.: WO2013/190807
PCT Pub. Date: Dec. 27, 2013

(65) Prior Publication Data
US 2015/0114974 A1 Apr. 30, 2015

(30) Foreign Application Priority Data

Jun. 20, 2012 (JP) .................................. 2012-138773
Jun. 20, 2012 (JP) .................................. 2012-138775

(51) Int. Cl.
*F17C 1/08* (2006.01)
*F16J 12/00* (2006.01)
(Continued)

(52) U.S. Cl.
CPC ................. *F17C 1/08* (2013.01); *B65D 25/04* (2013.01); *F16J 12/00* (2013.01); *F17C 1/00* (2013.01);
(Continued)

(58) Field of Classification Search
CPC .... F17C 1/08; F17C 1/00; F17C 2201/0157; F17C 2201/056; F17C 2201/058; F17C 2203/012; F17C 2203/0617; F17C 2260/012; F16J 12/00; B65D 25/04
USPC ................. 220/592, 564, 608, 553
See application file for complete search history.

(56) References Cited

U.S. PATENT DOCUMENTS 8,714,400 B2 5/2014 Kataoka et al.
2001/0019061 A1* 9/2001 Ettlinger ................... F17C 1/08
220/651

(Continued)

FOREIGN PATENT DOCUMENTS

JP 2005-155776 A 6/2005
JP 2008-503703 A 2/2008
(Continued)

OTHER PUBLICATIONS

International Search Report; PCT/JP2013/003722; Sep. 17, 2013.
(Continued)

*Primary Examiner* — J. Gregory Pickett
*Assistant Examiner* — Niki M Eloshway
(74) *Attorney, Agent, or Firm* — Studebaker & Brackett PC

(57) ABSTRACT

Provided is a pressure vessel having a vessel main body and a partition wall. The vessel main body is provided with a top wall, a bottom wall, and a peripheral wall. The top wall is provided with: a top-wall main body; a top-wall protruded part having a shape which protrudes externally from an outer surface of the top-wall main body; top-wall first-chamber-side ribs; and top-wall second-chamber-side ribs. The bottom wall is provided with: a bottom-wall main body; a bottom-wall protruded part having a shape which protrudes externally from an outer surface of the bottom-wall main body; bottom-wall first-chamber-side ribs; and bottom-wall second-chamber-side ribs. The top-wall first-chamber-side ribs and the top-wall second-chamber-side ribs each have a shape which connects with the top-wall protruded part. The bottom-wall first-chamber-side ribs and the bottom-wall second-chamber-side ribs each have a shape which connects with the bottom-wall protruded part.

9 Claims, 7 Drawing Sheets

(51) Int. Cl.
*B65D 25/04* (2006.01)
*F17C 1/00* (2006.01)
*B65D 90/02* (2006.01)

(52) U.S. Cl.
CPC .. *F17C 2201/0157* (2013.01); *F17C 2201/056* (2013.01); *F17C 2201/058* (2013.01); *F17C 2203/012* (2013.01); *F17C 2203/0617* (2013.01); *F17C 2260/012* (2013.01)

(56) References Cited

U.S. PATENT DOCUMENTS

| | | |
|---|---|---|
| 2007/0194051 A1 | 8/2007 | Bakken et al. |
| 2009/0145909 A1* | 6/2009 | Hausberger ............... F17C 3/00 220/581 |
| 2009/0218354 A1* | 9/2009 | Yoo ............................ F17C 3/00 220/560.11 |
| 2010/0065559 A1* | 3/2010 | Spendlove ................ C10L 3/08 220/9.2 |
| 2013/0048646 A1* | 2/2013 | Kataoka ................... F16J 12/00 220/581 |
| 2013/0048654 A1* | 2/2013 | Kilduff ..................... B65F 1/122 220/694 |
| 2015/0090727 A1* | 4/2015 | Kataoka ................... F16J 12/00 220/592 |

FOREIGN PATENT DOCUMENTS

| | | |
|---|---|---|
| JP | 2010-243015 A | 10/2010 |
| JP | 2013-044387 A | 3/2013 |
| JP | 2013-044388 A | 3/2013 |

OTHER PUBLICATIONS

Written Opinion of the International Searching Authority; PCT/JP2013/003722; Sep. 17, 2013.

* cited by examiner

PRESSURE VESSEL

TECHNICAL FIELD

The present invention relates to a pressure vessel used as a compressor gas cooler or the like.

BACKGROUND ART

Conventionally, pressure vessels for receiving high pressure gas are known to include a partition wall dividing the inside thereof into two chambers. For example, Patent Document 1 discloses a pressure vessel having a vessel main body for receiving high pressure gas and a partition wall formed in the vessel main body so as to divide the inside thereof in half into a first chamber and a second chamber. The vessel main body includes a first side cylindrical wall and a second side cylindrical wall which are joined together with the partition wall being sandwiched therebetween. The vessel main body has an elongated shape in one direction. The partition wall is formed in the shape of a flat plate extending along the direction parallel to the longitudinal direction of the vessel main body. An upper end of the partition wall is connected to an upper part of the vessel main body, and a lower end of the partition wall is connected to a lower part of the vessel main body.

When the high pressure gas is received in the respective chambers of this pressure vessel, a load of the first side cylindrical wall and the second side cylindrical wall to expand outwardly is applied thereon. At this time, stress concentration occurs in connection parts of each cylindrical wall and the partition wall. Therefore, the upper end and the lower end of the partition wall are each formed with a widened portion having a thickness larger than that of other parts of the partition wall.

However, it cannot be said that the pressure vessel described in Patent Document 1 can sufficiently suppress the occurrence of stress concentration on the pressure vessel. That is, when the high pressure gas is received in the respective chambers of this pressure vessel, the respective cylindrical walls are deformed to expand outwardly, and therefore stress concentration occurs in the boundaries of thickness-direction ends of the widened portions and the respective cylindrical walls. (Hereinafter referred to as "a first problem".)

In addition, since the partition wall is connected to the upper part and the lower part of the vessel main body, the partition wall is pulled to the vertical direction (the direction orthogonal to each of the longitudinal direction and the thickness direction of the partition wall) by the upper part and the lower part of the vessel main body to expand outwardly when the load is applied on the respective cylindrical walls. Thereby, a tensile load in the vertical direction acts on the partition wall. It should be noted that substantially equal pressure from both the chambers adjacent to each other in the thickness direction is applied on the partition wall and therefore a bending moment hardly acts on the partition wall even if the high pressure gas is received in the respective chambers.

In general, the pressure vessels are required to secure a pressure resistant breaking strength larger than a predetermined value, as major design requirements on the strength. On the other hand, there is a need for reducing the weight of the pressure vessel as much as possible while satisfying the required design requirements. However, in the pressure vessel described in Patent Document 1, the partition wall requires a large enough thickness to withstand the tensile load, so that it is difficult to reduce the weight of the pressure vessel. (Hereinafter referred to as "a second problem".)

CITATION LIST

Patent Document

PATENT DOCUMENT 1: JP 2005-155776 A

SUMMARY OF THE INVENTION

A first object of the present invention is to provide a pressure vessel capable of suppressing the occurrence of stress concentration.

A second object of the present invention is to provide a pressure vessel capable of reducing weight while satisfying the required design requirements.

In order to solve the first problem, it is conceivable that reinforcing ribs are provided on each outer surface of the respective cylindrical walls for suppressing deformation of the respective cylindrical walls. However, there is a fear that stress concentration stays on the boundaries of the reinforcing ribs and the cylindrical walls, that is, on roots of the widened portion-side ends of the reinforcing ribs, by merely providing the reinforcing ribs on the surfaces of the respective cylindrical walls.

According to a first aspect of the present invention, a pressure vessel having a vessel main body for receiving high pressure gas, and a partition wall formed in the vessel main body so as to divide the inside thereof in half into a first chamber and a second chamber is provided. The vessel main body is provided with: a top wall connected to an upper end of the partition wall; a bottom wall facing the top wall and connected to a lower end of the partition wall; and a peripheral wall connecting the periphery of the top wall and the periphery of the bottom wall. The top wall is provided with: a top-wall main body connected to an upper end of the peripheral wall and the upper end of the partition wall; a top-wall protruded part having a shape which protrudes externally from a part, located on a back side of a connection part of an inner surface of the top-wall main body and the upper end of the partition wall, of an outer surface of the top-wall main body; top-wall first-chamber-side ribs arranged in a standing condition on the outer surface on the first chamber of the top-wall main body; and top-wall second-chamber-side ribs arranged in a standing condition on the outer surface on the second chamber of the top-wall main body. The bottom wall is provided with: a bottom-wall main body connected to a lower end of the peripheral wall and the lower end of the partition wall; a bottom-wall protruded part having a shape which protrudes externally from a part, located on a back side of a connection part of an inner surface of the bottom-wall main body and the lower end of the partition wall, of an outer surface of the bottom-wall main body; bottom-wall first-chamber-side ribs arranged in a standing condition on the outer surface on the first chamber of the bottom-wall main body; and bottom-wall second-chamber-side ribs arranged in a standing condition on the outer surface on the second chamber of the bottom-wall main body. The top-wall first-chamber-side ribs and the top-wall second-chamber-side ribs each have a shape which connects with the top-wall protruded part. The bottom-wall first-chamber-side ribs and the bottom-wall second-chamber-side ribs each have a shape which connects with the bottom-wall protruded part.

In order to solve the second problem, the present inventors focused on the fact that nonuniformity is generated in the distribution of the tensile load generated by action of internal pressure of high pressure gas received in the vessel main body, in the partition wall of the pressure vessel. That is, the present inventors focused on the fact that the partition wall with a constant thickness has parts on which only a relatively small tensile load acts and these parts are an excessively reinforced structure. Hence, the present inventors found that by cutting off the excessively reinforced parts of the partition wall in order to solve the generated nonuniformity of the distribution of tensile load in the partition wall, materials can be reduced and thereby reducing the weight of the whole pressure vessel.

According to another aspect of the present invention, a pressure vessel having a vessel main body for receiving high pressure gas, and a partition wall formed in the vessel main body so as to divide the inside thereof in half into a first chamber and a second chamber is provided. The vessel main body is provided with: a top wall connected to an upper end of the partition wall; a bottom wall facing the top wall and connected to a lower end of the partition wall; and a peripheral wall connecting the periphery of the top wall and the periphery of the bottom wall. The partition wall has an elongated shape in one direction. The partition wall is provided with: a first wall located in a region including the center in the longitudinal direction of the partition wall; a second wall located on one side in the longitudinal direction; and a third wall located on the other side in the longitudinal direction, and the thickness of the second wall and the thickness of the third wall are each set smaller than the thickness of the first wall.

DESCRIPTION OF THE EMBODIMENT

A preferred embodiment of the present invention will be described with reference to FIGS. 1 to 9.

Figure 1:
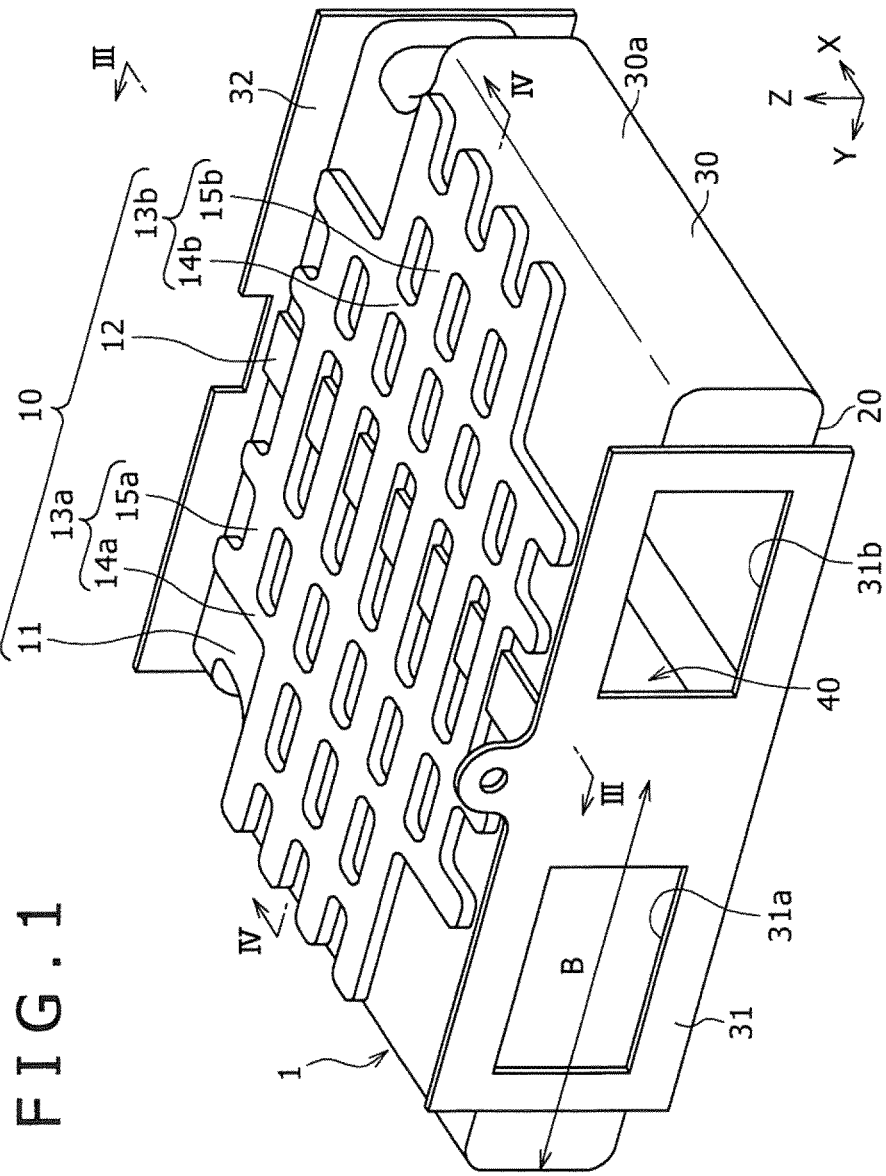
FIG. 1 is a perspective view of a pressure vessel of an embodiment of the present invention as viewed from above.

As shown in FIG. 1, a pressure vessel of the present embodiment has a substantially rectangular parallelepiped-shaped vessel main body 1 for receiving high pressure gas, and a partition wall 40 which divides the inside of the vessel main body 1 in half into a first chamber and a second chamber. Although a heat exchanger, piping and the like are housed in the first chamber and the second chamber, illustration thereof is omitted. The vessel main body 1 is provided with: a top wall 10 connected to an upper end of the partition wall 40; a bottom wall 20 facing the top wall 10 and connected to a lower end of the partition wall 40; a peripheral wall 30 connecting the periphery of the top wall 10 and the periphery of the bottom wall 20. In addition, in the following description, the alignment direction of the top wall 10 and the bottom wall 20 is referred to as a Z-axis direction, the alignment direction of the first chamber and the second chamber is referred to as a Y-axis direction, and the direction orthogonal to the Z-axis direction and the Y-axis direction is referred to as an X-axis direction.

Ordinarily, when the high pressure gas is enclosed in such a pressure vessel, on the top wall 10, the bottom wall 20, and the peripheral wall 30, a load in the direction in which the respective walls expand outwardly, acts respectively. At this time, a relatively large load acts on a connection part of the top wall 10 and the partition wall 40 and a connection part of the bottom wall 20 and the partition wall 40. In the present embodiment, occurrence of stress concentration in the vicinity of the connection parts is suppressed by reinforcing the connection parts, and occurrence of stress concentration on the top wall 10 and the bottom wall 20, which is difficult to suppress by merely reinforcing the connection parts, is suppressed.

Specifically, as shown in FIG. 1, the top wall 10 is provided with: a flat plate shaped top-wall main body 11; a top-wall protruded part 12 having a shape which protrudes externally from a surface of the top-wall main body 11; top-wall first-chamber-side ribs 13a arranged in a standing condition on the first chamber side of an outer surface of the top-wall main body 11; and top-wall second-chamber-side ribs 13b arranged in a standing condition on the second chamber side of the outer surface of the top-wall main body 11.

Figure 4:
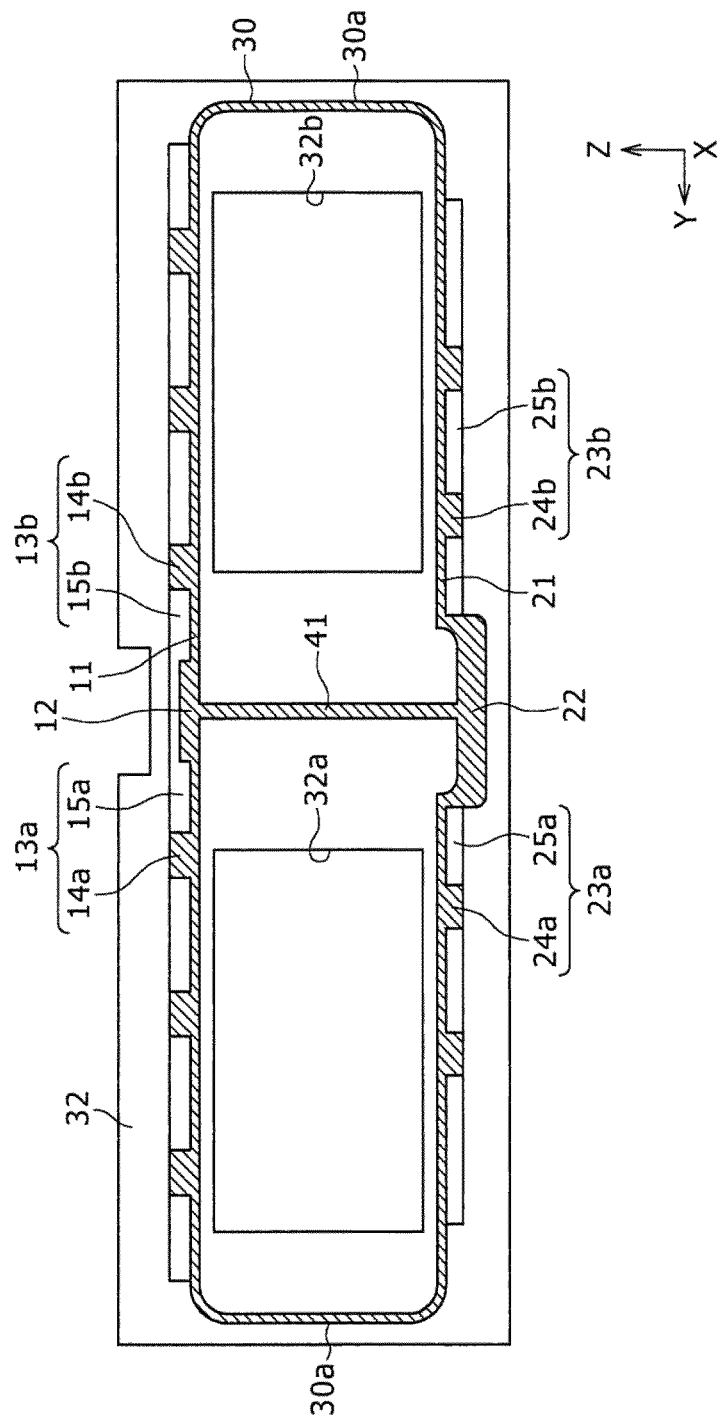
FIG. 4 is a cross-sectional view taken along the line IV-IV of FIG. 1.

The top-wall main body 11 has a shape which closes an upper end of the peripheral wall 30. The top-wall main body 11 connects with the upper end of the peripheral wall 30 and connects with the upper end of the partition wall 40. As shown in FIG. 4, the boundary of the top-wall main body 11 and the peripheral wall 30 is a curved surface convexed externally. In the present embodiment, the top-wall main body 11 has a substantially rectangular shape long in the alignment direction (the Y-axis direction) of the first chamber and the second chamber.

As shown in FIG. 4, the top-wall protruded part 12 is formed in a region including a part located on a back side of a connection part of an inner surface of the top-wall main body 11 and the upper end of the partition wall 40, of the outer surface of the top-wall main body 11. The top-wall protruded part 12 has a shape which extends along the lateral direction (the X-axis direction: the width direction) of the top-wall main body 11 at substantially the center in the longitudinal direction of the top-wall main body 11. In the present embodiment, the amount of protrusion of the top-wall protruded part 12 from the outer surface of the top-wall main body 11 is constant over the whole area in the longitudinal direction of the top-wall protruded part 12. The dimension in the lateral direction (the Y-axis direction) of the top-wall protruded part 12 is set larger than the dimension in the same direction of the connection part of the inner surface of the top-wall main body 11 and the upper end of the partition wall 40.

The top-wall first-chamber-side ribs 13a reinforce a part on the first chamber side of the top-wall main body 11. The top-wall first-chamber-side ribs 13a are provided with: a plurality of lateral ribs (width direction ribs) 14a having a shape which extends along the direction parallel to the lateral direction (the width direction) of the top-wall main body 11; and a plurality of longitudinal ribs 15a having a shape which extends along the direction parallel to the longitudinal direction of the top-wall main body 11, that is, along the direction crossing the top-wall protruded part 12. The lateral ribs 14a and the longitudinal ribs 15a each have the same height (the amount of protrusion to the positive side in the Z-axis direction from the top-wall main body 11). The height of each of the ribs 14a and 15a is set larger than that of the top-wall protruded part 12. The respective longitudinal ribs 15a have a shape which connects with a side surface and a top surface of the top-wall protruded part 12. In the present embodiment, the top-wall first-chamber-side ribs 13a are provided with three lateral ribs 14a and six longitudinal ribs 15a. In addition, the top-wall first-side ribs 13a are formed in a region excluding corners of the top-wall main body 11. That is, the length (the dimension in the X-axis direction) of the rib 14a arranged in a standing condition at the outermost side of the plurality of lateral ribs 14a is shorter than the length of the rib 14a arranged in a standing condition just inside the rib. Further, the length (the dimension in the Y-axis direction) of the rib 15a arranged in a standing condition at the outermost side of the plurality of longitudinal ribs 15a is shorter than the length of the rib 15a arranged in a standing condition just inside the rib.

The top-wall second-chamber-side ribs 13b reinforce a part on the second chamber side of the top-wall main body 11. The top-wall second-chamber-side ribs 13b are provided with: a plurality of lateral ribs (width direction ribs) 14b having a shape which extends along the direction parallel to the lateral direction (the width direction) of the top-wall main body 11; and a plurality of longitudinal ribs 15b having a shape which extends along the direction parallel to the longitudinal direction of the top-wall main body 11, that is, along the direction crossing the top-wall protruded part 12. The lateral ribs 14b and the longitudinal ribs 15b each have the same height (the amount of protrusion to the positive side in the Z-axis direction from the top-wall main body 11). The height of each of the ribs 14a and 15a is set larger than that of the top-wall protruded part 12. The respective longitudinal ribs 15b have a shape which connects with the side surface and the top surface of the top-wall protruded part 12. In addition, the respective longitudinal ribs 15a of the top-wall first-chamber-side ribs 13a and the respective longitudinal ribs 15b of the top-wall second-chamber-side ribs 13b have a shape which connects with each other on the top surface of the top-wall protruded part 12. That is, the respective longitudinal ribs 15a and 15b have a shape which extends along the longitudinal direction of the top-wall main body 11 so as to straddle the upper side of the top-wall protruded part 12 while being in contact with the top-wall protruded part 12. In the present embodiment, the top-wall second-chamber-side ribs 13b are provided with three lateral ribs 14b and six longitudinal ribs 15b. In addition, the top-wall second-chamber-side ribs 13b are formed in a region excluding the corners of the top-wall main body 11. That is, the length (the dimension in the X-axis direction) of the rib 14b arranged in a standing condition at the outermost side of the plurality of lateral ribs 14b is shorter than the length of the rib 14b arranged in a standing condition just inside the rib. Further, the length (the dimension in the Y-axis direction) of the rib 15b arranged in a standing condition at the outermost side of the plurality of longitudinal ribs 15b is shorter than the length of the rib 15b arranged in a standing condition just inside the rib.

Figure 2:
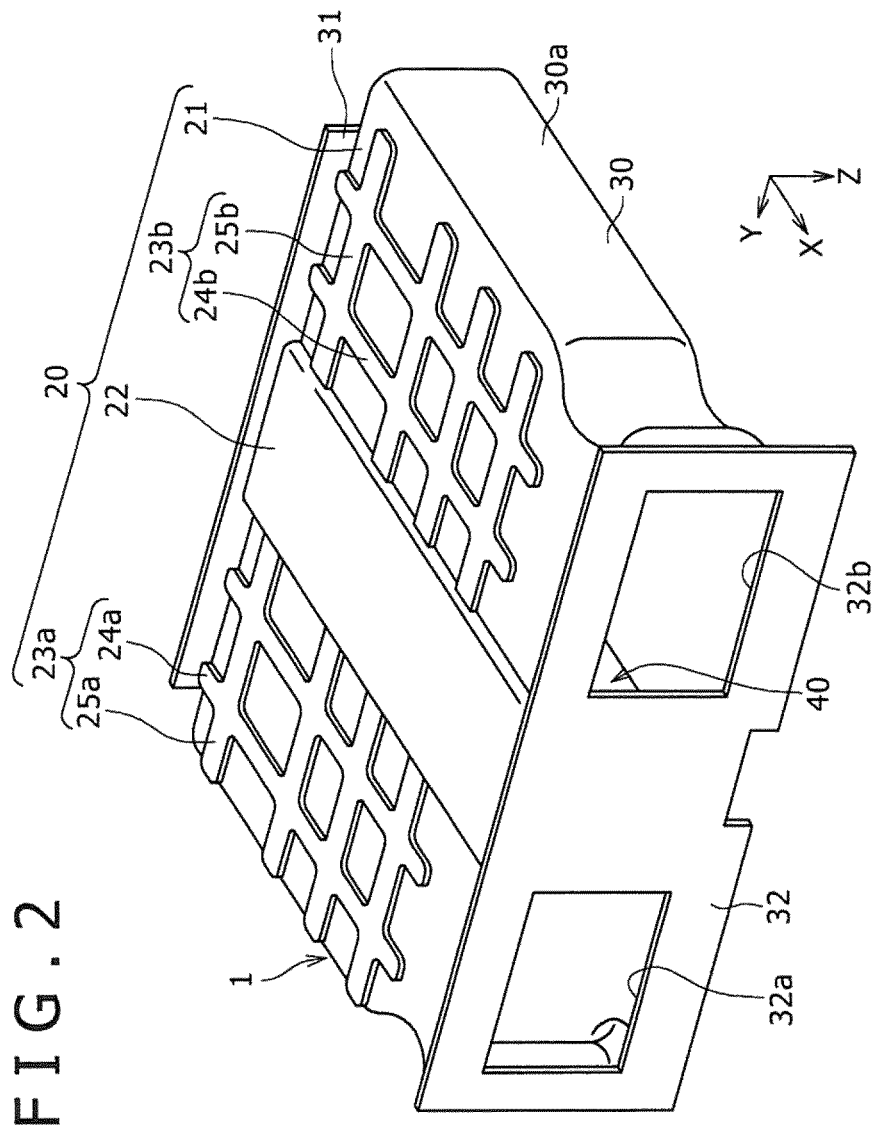
FIG. 2 is a perspective view of the pressure vessel of FIG. 1 as viewed from below.

As shown in FIG. 2, the bottom wall 20 is provided with: a bottom-wall main body 21 having the same shape as the top-wall main body 11; a bottom-wall protruded part 22 having a shape which protrudes externally from a surface of the bottom-wall main body 21; bottom-wall first-chamber-side ribs 23a arranged in a standing condition on the first chamber side of an outer surface of the bottom-wall main body 21; and bottom-wall second-chamber-side ribs 23b arranged in a standing condition on the second chamber side of the outer surface of the top-wall main body 11.

The bottom-wall main body 21 has a shape which closes a lower end of the peripheral wall 30. The bottom-wall main body 21 connects with the lower end of the peripheral wall 30 and connects with the lower end of the partition wall 40. As shown in FIG. 4, the boundary of the bottom-wall main body 21 and the peripheral wall 30 is a curved surface convexed externally.

As shown in FIG. 4, the bottom-wall protruded part 22 is formed in a region including a part located on a back side of a connection part of an inner surface of the bottom-wall main body 21 and the lower end of the partition wall 40, of the outer surface of the bottom-wall main body 21. The bottom-wall protruded part 22 has a shape which extends along the lateral direction (the X-axis direction: the width direction) of the bottom-wall main body 21 at substantially the center in the longitudinal direction of the bottom-wall main body 21. In the present embodiment, the amount of protrusion of the bottom-wall protruded part 22 from the outer surface of the bottom-wall main body 21 is constant over the whole area in the longitudinal direction of the bottom-wall protruded part 22. The dimension in the lateral direction (the Y-axis direction: the width direction) of the bottom-wall protruded part 22 is set larger than the dimension in the same direction of the connection part of the inner surface of the bottom-wall main body 21 and the lower end of the partition wall 40. In addition, a part of the bottom-wall main body 21 connecting to the bottom-wall protruded part 22 has a shape which protrudes externally (downwardly in FIG. 4) than other parts of the bottom-wall main body 21.

The bottom-wall first-chamber-side ribs 23a reinforce a part on the first chamber side of the bottom-wall main body 21. The bottom-wall first-chamber-side ribs 23a are provided with: a plurality of lateral ribs (width direction ribs) 24a having a shape which extends along the direction parallel to the lateral direction of the bottom-wall main body 21; and a plurality of longitudinal ribs 25a having a shape which extends along the direction parallel to the longitudinal direction of the bottom-wall main body 21, that is, along the direction crossing the bottom-wall protruded part 22. The lateral ribs 24a and the longitudinal ribs 25a each have the same height (the amount of protrusion to the negative side in the Z-axis direction from the bottom-wall main body 21). The height of each of the ribs 24a and 25a is set smaller than that of the bottom-wall protruded part 22. The respective longitudinal ribs 25a have a shape which connects with a side surface of the bottom-wall protruded part 22. In the present embodiment, the bottom-wall first-chamber-side ribs 23a are provided with two lateral ribs 24a and four longitudinal ribs 25a.

The bottom-wall second-chamber-side ribs 23b reinforce a part on the second chamber side of the bottom-wall main body 21. The bottom-wall second-chamber-side ribs 23b are provided with: a plurality of lateral ribs (width direction ribs) 24b having a shape which extends along the direction parallel to the lateral direction of the bottom-wall main body 21; and a plurality of longitudinal ribs 25b having a shape which extends along the direction parallel to the longitudinal direction of the bottom-wall main body 21, that is, along the direction crossing the bottom-wall protruded part 22. The lateral ribs 24b and the longitudinal ribs 25b each have the same height (the amount of protrusion to the negative side in the Z-axis direction from the bottom-wall main body 21). The height of each of the ribs 24b and 25b is set smaller than that of the bottom-wall protruded part 22. The respective longitudinal ribs 25b have a shape which connects with the side surface of the bottom-wall protruded part 22. In the present embodiment, the bottom-wall second-chamber-side ribs 23b are provided with two lateral ribs 24b and four longitudinal ribs 25b.

The peripheral wall 30 connects the periphery of the top-wall main body 11 and the periphery of the bottom-wall main body 21. In the present embodiment, the peripheral wall 30 is formed in the shape of a substantially square cylinder shape having a constant thickness over the whole circumference. The peripheral wall 30 is provided with: partition-wall facing parts 30a facing the partition wall 40; and a first side wall 31 and a second side wall 32 connected to the partition wall 40 in an attitude orthogonal to the partition wall 40.

The respective partition-wall facing parts 30a have a shape which extends in the direction parallel to the longitudinal direction (the X-axis direction) of the partition wall 40. As shown in FIG. 1, the first side wall 31 has a first opening 31a for opening the first chamber to the outside of the vessel main body 1 and a second opening 31b for opening the second chamber to the outside of the vessel main body 1. As shown in FIG. 2, the second side wall 32 has a first opening 32a for opening the first chamber to the outside of the vessel main body 1 and a second opening 32b for opening the second chamber to the outside of the vessel main body 1. After a heat exchanger, piping and the like are housed in the first chamber and the second chamber, the respective openings 31a to 32b are closed by a cover having a shape which covers the opening, respectively. It should be noted that illustration of the cover is omitted in the figures.

Here, as described above, when the high pressure gas is enclosed in this pressure vessel, on the top wall 10, the bottom wall 20, and the peripheral wall 30, a load in the direction in which the respective walls expand outwardly, acts respectively. At this time, the partition wall 40 is pulled to the vertical direction (the Z-axis direction) connecting the top wall 10 and the bottom wall 20 by the top wall 10 and the bottom wall 20 to expand outwardly. Therefore, a tensile load in the vertical direction acts on the partition wall 40. The tensile load is not uniformly distributed over the whole area of the partition wall 40. That is, in the partition wall 40, a part on which a relatively large tensile load acts and parts on which a small tensile load acts exist. Specifically, the tensile load is maximum at a center part of the partition wall 40, and is gradually decreased toward both ends (connection parts of the partition wall 40 and the peripheral wall 30) of the partition wall 40 from the center part. This is because the deformation amount of the top-wall main body 11 and the bottom-wall main body 21 is maximum at center parts of the top-wall main body 11 and the bottom-wall main-body 21 respectively and is gradually decreased toward the outside (the connection parts of the respective wall main bodies and the peripheral wall 30) from the center parts. Thus, in the present embodiment, the thickness of the partition wall 40 is substantially matched to the distribution of the tensile load acting on the partition wall 40. That is, basically, the thickness of the part of the partition wall 40 on which a relatively large tensile load acts is increased, and the thickness of the parts on which only a relatively small tensile load acts is decreased.

Figure 3:
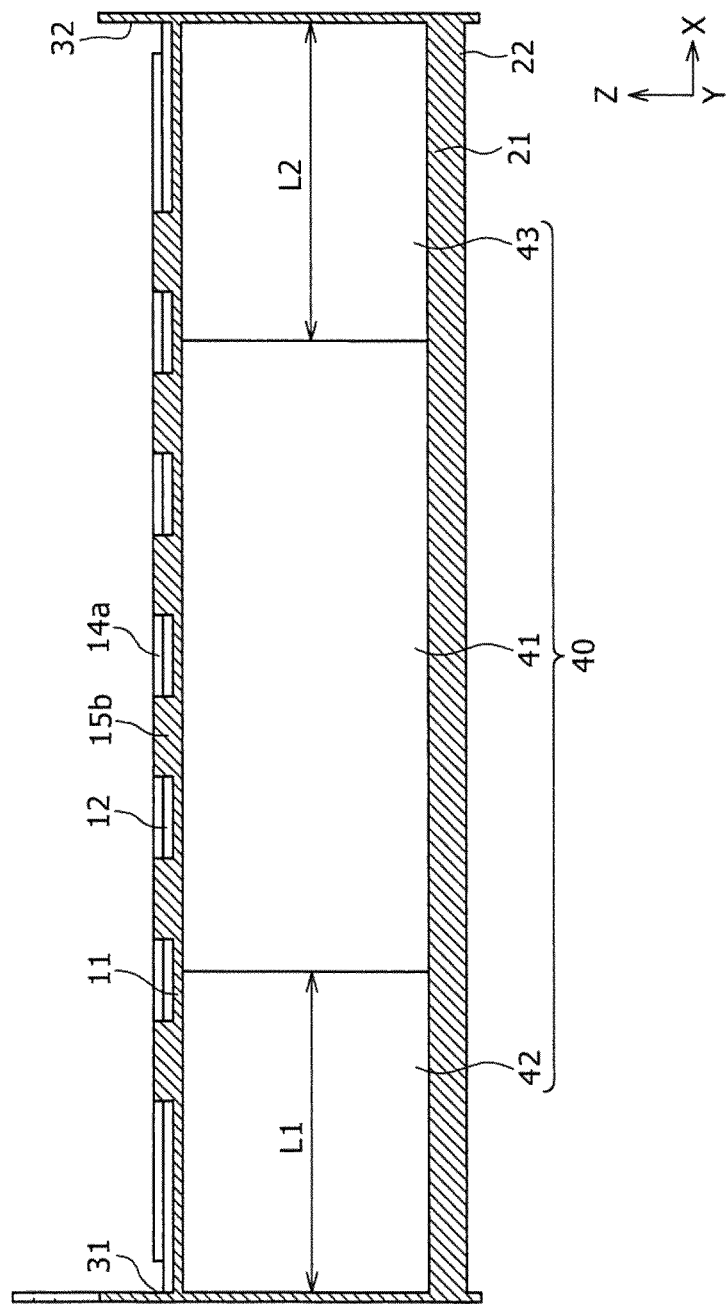
FIG. 3 is a cross-sectional view taken along the line III-III of FIG. 1.

Specifically, as shown in FIGS. 3 and 4, the partition wall 40 is formed in a rectangular flat plate shape long in the direction (the X-axis direction) orthogonal to each of the direction (the Z-axis direction) connecting the connection part of the partition wall 40 and the top-wall main body 11 and the connection part of the partition wall 40 and the bottom-wall main body 21 and the thickness direction (the Y-axis direction) of the partition wall 40. It should be noted that FIG. 3 is a cross-sectional view taken along the line III-III of FIG. 1. The line III-III passes between the top-wall protruded part 12 and the lateral rib 14b located next to the top-wall protruded part 12. The partition wall 40 is provided with: a first wall 41 located in a region including the center in the longitudinal direction of the partition wall 40; a second wall 42 located on one side in the longitudinal direction; and a third wall 43 located on the other side in the longitudinal direction. The respective walls 41 to 43 are connected in order of the second wall 42, the first wall 41, and the third wall 43 from one side to the other side in the longitudinal direction. It should be noted that the partition wall 40 has a rectangular shape long in one direction (the X-axis direction) as viewed from the Y-axis direction in the present embodiment but may have a square shape as viewed from the same direction. Hereinafter, in each case, the X-axis direction will be described as the longitudinal direction of the partition wall 40.

Figure 5A:
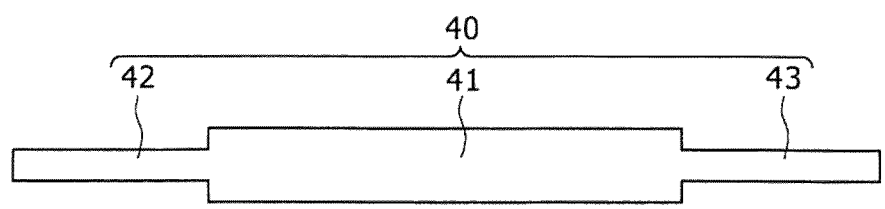
FIG. 5A is a cross-sectional view in the XY plane of a partition wall.
Figure 5B:
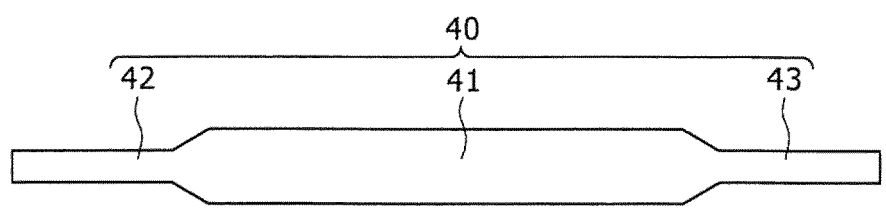
FIG. 5B shows a modification example of FIG. 5A.

The first wall 41, the second wall 42, and the third wall 43 are all formed in a rectangular flat plate shape long in one direction (the X-axis direction). The first wall 41, the second wall 42, and the third wall 43 are connected to the top-wall main body 11 at the respective upper ends thereof and connected to the bottom-wall main body 21 at the respective lower ends thereof. The end of the second wall 42 opposite to the end connected to the first wall 41 is connected to the first side wall 31. The end of the third wall 43 opposite to the end connected to the first wall 41 is connected to the second side wall 32. As shown in FIG. 5A, the second wall 42 has a shape having a thickness smaller than that of the first wall 41. The third wall 43 has a shape having a thickness smaller than that of the first wall 41. In the present embodiment, the first wall 41, the second wall 42, and the third wall 43 are set to have a uniform thickness over the whole area in the longitudinal direction (the X-axis direction) thereof, respectively. Further, a center axis passing the center in the thickness direction (the Y-axis direction) of the first wall 41 and extending in the longitudinal direction of the first wall 41 passes the center in the thickness direction (the Y-axis direction) of the second wall 42 and passes the center in the thickness direction (the Y-axis direction) of the third wall 43. In other words, the respective center axes of the respective walls 41 to 43 coincide with each other. Here, as shown in FIG. 5B, preferably, the surface of the first wall 41 and the surface of the second wall 42 are smoothly connected to each other, and the surface of the first wall 41 and the surface of the third wall 43 are smoothly connected to each other. In this way, the occurrence of stress concentration in the vicinity of the boundary of the first wall 41 and the second wall 42 and in the vicinity of the boundary of the first wall 41 and the third wall 43 is suppressed.

Figure 6:
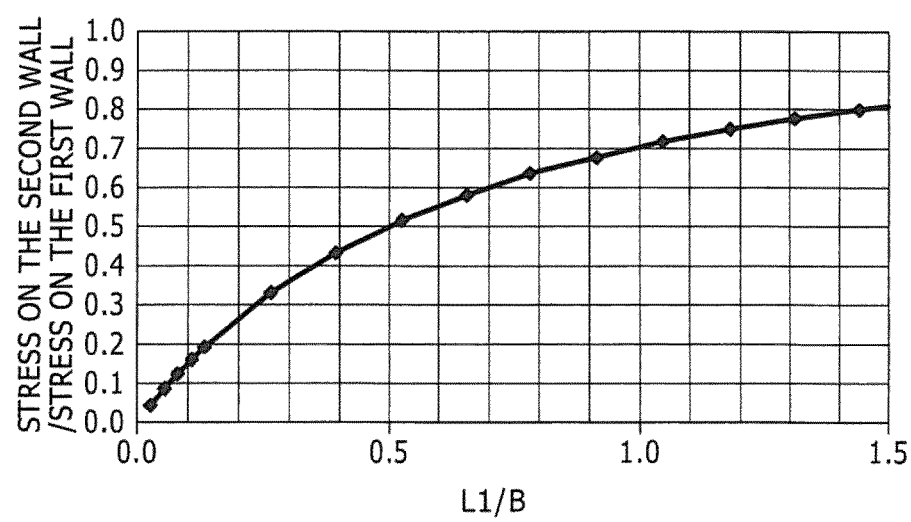
FIG. 6 is a graph showing the relationship between length dimension of a second wall and stress.

Preferably, the dimension L1 in the longitudinal direction of the second wall 42 and the dimension L2 in the longitudinal direction of the third wall 43 are set to less than one-half of the dimension B between the partition-wall facing parts 30a and the partition wall 40 (see FIG. 1), respectively. This is because in the area where the dimension L1 is less than one-half of the dimension B, the stress generated in the second wall 42 is less than the stress generated in the first wall 41, as shown in FIG. 6. Therefore, by setting the dimension L1 to less than one-half of the dimension B, it is possible to set the thickness of the second wall 42 to less than one-half of the thickness of the first wall 41. The same applies to the third wall 43 too. In the present embodiment, the dimension L1 in the longitudinal direction of the second wall 42 and the dimension L2 in the longitudinal direction of the third wall 43 are made identical.

When the vertical tensile load acts on the first wall 41 by receiving the high pressure gas in the vessel main body 1, stress is generated in the first wall 41. The thickness of the first wall 41 may be set so that the stress is uniformly distributed in the first wall 41. The same applies to the second wall 42 and the third wall 43 too. In this way, the thickness of the respective walls 41 to 43 is optimized. Accordingly, unnecessary use of materials is eliminated, and the weight of the pressure vessel is further reduced.

Figure 8:
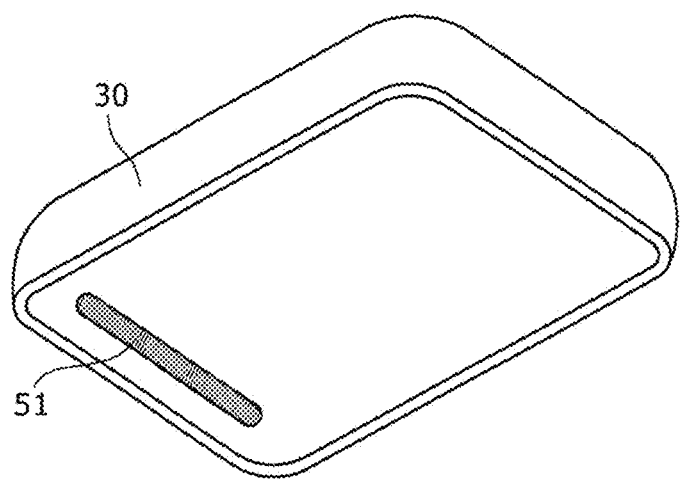
FIG. 8 is a perspective view of an upper half of a vessel main body as viewed from below.
Figure 9:
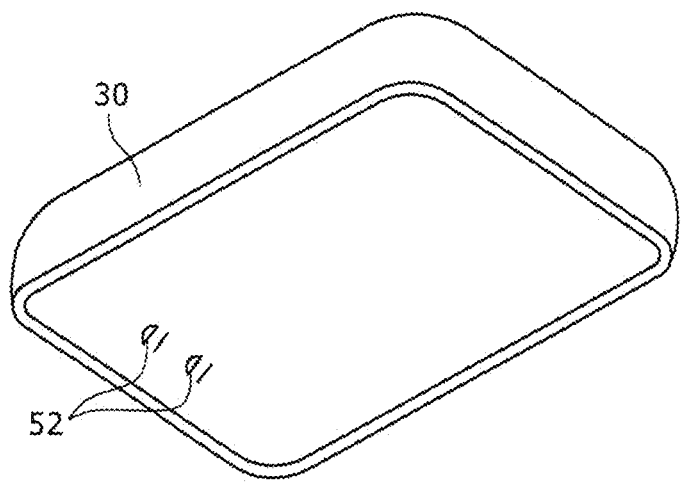
FIG. 9 is a perspective view of the upper half of the vessel main body as viewed from below.

In addition, when the high pressure gas is enclosed in the vessel main body 1 described above, a relatively high stress is generated in the vicinity of the boundaries of the top-wall main body 11 and the partition-wall facing parts 30a and in the vicinity of the boundaries of the bottom-wall main body 21 and the partition-wall facing parts 30a. Therefore, it is preferable that the vessel main body 1 further has reinforcing parts for reinforcing the vicinity of the boundaries. In the present embodiment, the parts where the high stress is generated are similar on the top-wall 10 side and the bottom-wall 20 side, so that the top-wall 10 side will be described as an example. Specifically, as shown in FIGS. 8 and 9, it is preferable that upper-side reinforcing parts 51, 52 are provided. The upper-side reinforcing part 51 shown in FIG. 8 is formed in the boundary of an inner surface of the partition-wall facing part 30a and the inner surface of the top-wall main body 11, and has a shape which bulges internally and extends along the boundary. The upper-side reinforcing part 52 shown in FIG. 9 has a shape connected to the inner surface of the partition-wall facing part 30a and the inner surface of the top-wall main body 11 so as to straddle the boundary of the inner surface of the partition-wall facing part 30a and the inner surface of the top-wall main body 11. It should be noted that the upper-side reinforcing parts 51, 52 may be provided on an outer surface rather than an inner surface of the vessel main body 1.

As described above, in the pressure vessel of the present invention, the occurrence of stress concentration on the pressure vessel is suppressed. Specifically, since the connection part of the top-wall main body 11 and the partition wall 40 is reinforced by the top-wall protruded part 12, the occurrence of stress concentration on that part is suppressed. Further, since the top-wall main body 11 is reinforced by the top-wall first-chamber-side ribs 13a and the top-wall second-chamber-side ribs 13b, deformation of the top-wall main body 11 is suppressed. Furthermore, since the top-wall first-chamber-side ribs 13a and the top-wall second-chamber-side ribs 13b have a shape which connects with the top-wall protruded part 12, that is, a shape continuous in the vicinity of the connection part of the top-wall main body 11 and the partition wall 40, the occurrence of stress concentration on the boundaries of the ribs and the top-wall main body 11 is suppressed. The same applies to the bottom-wall 20 side too. That is, according to the pressure vessel of the present embodiment, the occurrence of stress concentration on the top wall 10 and the bottom wall 20, which is difficult to suppress by merely reinforcing the connection parts of the vessel main body 1 and the partition wall 40, is suppressed. Thereby, since the thickness of the top-wall main body 11 and the bottom-wall main body 21 can be decreased, it is possible to reduce the weight of the whole pressure vessel.

In addition, in the present embodiment, the top-wall first chamber-side ribs 13a and the top-wall second-chamber-side ribs 13b have a shape which connects with each other on the upper side of the top-wall protruded part 12 and connects with the top surface of the top-wall protruded part 12. Therefore, the occurrence of stress concentration on the connection parts of the top-wall main body 11 and the partition wall 40 and the boundaries of the respective ribs 13a and 13b and the top-wall protruded part 12 is further suppressed.

In addition, in the present embodiment, the thickness of the parts of the partition wall 40 on which only a relatively small tensile load acts is smaller than the thickness of the part on which a relatively large tensile load acts, so that the weight of the whole pressure vessel is reduced by material reduction while satisfying the required design requirements. Specifically, the thickness of each of the second wall 42 and the third wall 43 is set smaller than the thickness of the first wall 41 in a range satisfying the required design requirements for the pressure vessel, so that materials are reduced and thereby reducing the weight of the pressure vessel.

In addition, in the present embodiment, the dimension L1 in the longitudinal direction of the second wall 42 and the dimension L2 in the longitudinal direction of the third wall 43 are less than one-half of the dimension B between the partition wall 40 and the partition-wall facing parts 30a, respectively. Therefore, it is possible to sufficiently secure the dimension in the longitudinal direction of the first wall 41 that is the part of the partition wall 40 on which a relatively large tensile load acts, thereby satisfying the design requirements. Moreover, the thickness of the second wall 42 and the third wall 43 that are the parts of the partition wall 40 on which only a relatively small tensile load acts is smaller than the thickness of the first wall 41 respectively, so that it is possible to achieve even weight reduction of the pressure vessel.

Figure 7:
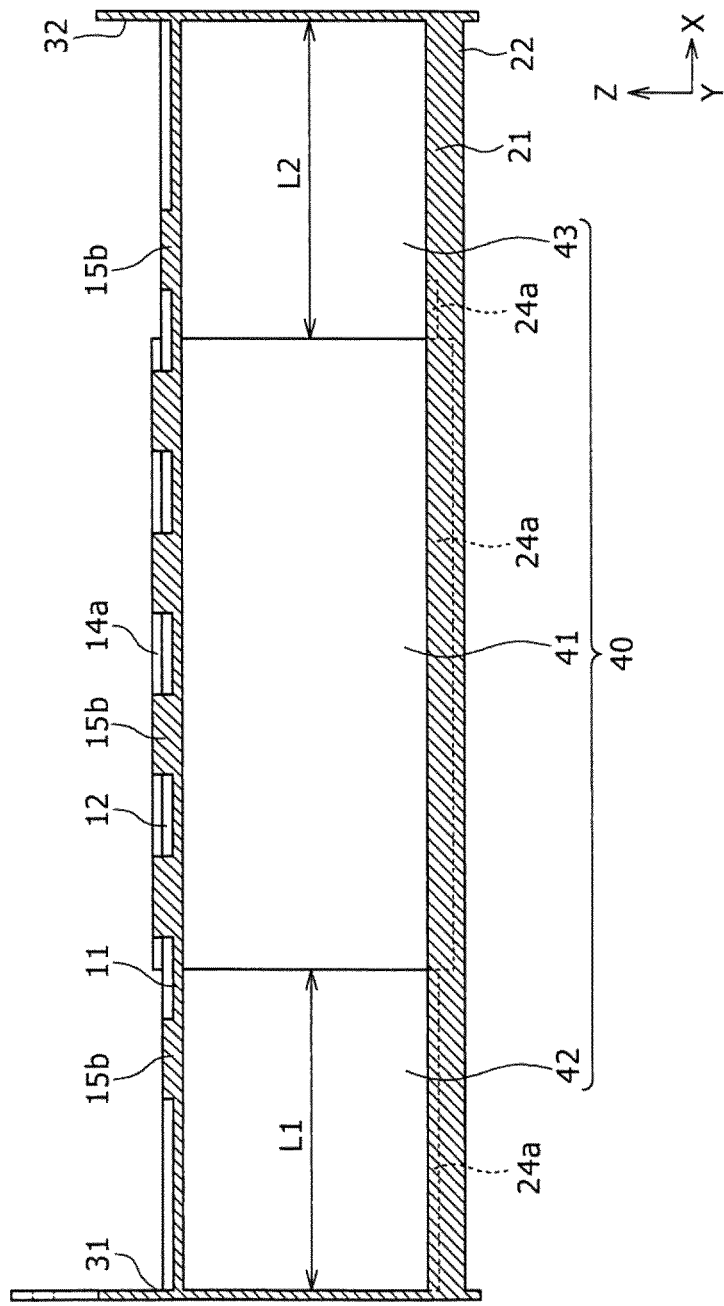
FIG. 7 is a cross-sectional view showing an example in which height dimension of each rib is changed.

Next, a modification example of the present embodiment will be described with reference to FIG. 7. As described above, the deformation amount of the top-wall main body 11 when the high pressure gas is enclosed in the first chamber and the second chamber of the vessel main body 1 is smaller in the part near the connection part of the top-wall main body 11 and the peripheral wall 30 than in the center part. Specifically, compared to the deformation amount of a first region of the top-wall main body 11 adjacent to the first wall 41 in the thickness direction (the Y-axis direction) of the first wall 41, the deformation amount of second regions (a region of the top-wall main body 11 adjacent to the second wall 42 in the thickness direction of the second wall 42 and a region of the top-wall main body 11 adjacent to the third wall 43 in the thickness direction of the third wall 43) other than the first region is reduced. Therefore, the height dimension of the parts arranged in a standing condition in the second regions of the top-wall first-chamber-side ribs 13a and the top-wall second-chamber-side ribs 13b may be set smaller than the height dimension of the part arranged in a standing condition in the first region. In this manner, the height dimension of the ribs arranged in a standing condition in the second region that is a region of the top-wall main body 11 on which only a relatively small stress is generated is made smaller than the height dimension of the ribs arranged in a standing condition in the first region that is a region of the top-wall main body 11 on which a relatively large stress is generated, and thereby the strength of the top-wall main body 11 can be improved while avoiding a significant weight increase. The same applies to the bottom-wall 20 side too.

It should be noted that the embodiment disclosed herein should be considered to be illustrative and not restrictive in every respect. The scope of the present invention is defined not by the above description of the embodiment but by the claims, and all changes that fall within the meanings and scope equivalent to the claims are embraced by the claims.

For example, in the above embodiment, although the vessel main body 1 has a rectangular parallelepiped-shape long in the Y-axis direction, the vessel main body 1 may have a rectangular parallelepiped-shape long in the X-axis direction.

In addition, in the above embodiment, although the partition-wall facing parts 30a of the peripheral wall 30 have a shape which extends in the direction parallel to the longitudinal direction of the partition wall 40, the partition-wall facing parts 30a may be curved so as to be convex toward the outside of the vessel main body 1.

Here, the above embodiment will be described in summary.

(1) A pressure vessel of the above embodiment has a vessel main body for receiving high pressure gas, and a partition wall formed in the vessel main body so as to divide the inside thereof in half into a first chamber and a second chamber. The vessel main body is provided with: a top wall connected to an upper end of the partition wall; a bottom wall facing the top wall and connected to a lower end of the partition wall; and a peripheral wall connecting the periphery of the top wall and the periphery of the bottom wall. The top wall is provided with: a top-wall main body connected to an upper end of the peripheral wall and the upper end of the partition wall; a top-wall protruded part having a shape which protrudes externally from a part, located on a back side of a connection part of an inner surface of the top-wall main body and the upper end of the partition wall, of an outer surface of the top-wall main body; top-wall first-chamber-side ribs arranged in a standing condition on the outer surface on the first chamber of the top-wall main body; and top-wall second-chamber-side ribs arranged in a standing condition on the outer surface on the second chamber of the top-wall main body. The bottom wall is provided with: a bottom-wall main body connected to a lower end of the peripheral wall and the lower end of the partition wall; a bottom-wall protruded part having a shape which protrudes externally from a part, located on a back side of a connection part of an inner surface of the bottom-wall main body and the lower end of the partition wall, of an outer surface of the bottom-wall main body; bottom-wall first-chamber-side ribs arranged in a standing condition on the outer surface on the first chamber of the bottom-wall main body; and bottom-wall second-chamber-side ribs arranged in a standing condition on the outer surface on the second chamber of the bottom-wall main body. The top-wall first-chamber-side ribs and the top-wall second-chamber-side ribs each have a shape which connects with the top-wall protruded part. The bottom-wall first-chamber-side ribs and the bottom-wall second-chamber-side ribs each have a shape which connects with the bottom-wall protruded part.

According to this pressure vessel, the occurrence of stress concentration on the pressure vessel is suppressed. Specifically, since the connection part of the top-wall main body and the partition wall is reinforced by the top-wall protruded part having a shape which protrudes externally from the part of the outer surface of the top-wall main body located on the back side of the connection part, the occurrence of stress concentration on that part is suppressed. Further, since the top-wall main body is reinforced by the top-wall first-chamber-side ribs and the top-wall second-chamber-side ribs, deformation of the top-wall main body is suppressed. Furthermore, since these ribs have a shape which connects with the top-wall protruded part, that is, a shape continuous in the vicinity of the connection part of the top-wall main body, the occurrence of stress concentration on the boundaries of the ribs and the top-wall main body is suppressed. The same applies to the bottom-wall side too. That is, according to this pressure vessel, the occurrence of stress concentration which is difficult to suppress by merely reinforcing the connection parts of the vessel main body and the partition wall, can be suppressed. Thereby, since the thickness of the top-wall main body and the thickness of the bottom-wall main body can be decreased respectively, it is possible to reduce the weight of the whole pressure vessel.

(2) The top-wall first chamber-side ribs and the top-wall second-chamber-side ribs may have a shape which connects with each other on the upper side of the top-wall protruded part and connects with a top surface of the top-wall protruded part.

In this mode, the occurrence of stress concentration on the connection parts of the top-wall main body and the partition wall and the boundaries of the respective ribs and the top-wall protruded part is further suppressed.

(3) The vessel main body may further have upper-side reinforcing parts for reinforcing the boundaries of partition-wall facing parts facing the partition wall of the peripheral wall and the top-wall main body, and lower-side reinforcing parts for reinforcing the boundaries of the partition-wall facing parts and the bottom-wall main body.

In this mode, the occurrence of stress concentration on the boundaries of the partition-wall facing parts and the top-wall main body and the boundaries of the partition-wall facing parts and the bottom-wall main body is effectively suppressed.

(4) The partition wall may have an elongated shape in the direction orthogonal to both the direction connecting the top wall and the bottom wall and the thickness direction of the partition wall. Further, the partition wall may be provided with: a first wall located in a region including the center in the longitudinal direction of the partition wall; a second wall located on one side in the longitudinal direction; and a third wall located on the other side in the longitudinal direction, and the thickness of the second wall and the thickness of the third wall may each be set smaller than the thickness of the first wall.

In this manner, by reducing the thickness of the parts of the partition wall on which only a relatively small tensile load acts, the weight of the whole pressure vessel can be reduced by material reduction while satisfying the required design requirements. Specifically, in this pressure vessel, compared to the first wall located in the region of the partition wall including the center in the longitudinal direction of the partition wall, on the parts of the partition wall near the peripheral wall, that is, on the second wall located on one side in the longitudinal direction of the partition wall and the third wall located on the other side thereof, only a small tensile load acts. Hence, the thickness of each of the second wall and the third wall can be made smaller than the thickness of the first wall in a range satisfying the required design requirements for the pressure vessel. Thereby, weight reduction of the pressure vessel due to the material reduction is achieved.

(5) A pressure vessel of the above embodiment has a vessel main body for receiving high pressure gas, and a partition wall formed in the vessel main body so as to divide the inside thereof in half into a first chamber and a second chamber. The vessel main body is provided with: a top wall connected to an upper end of the partition wall; a bottom wall facing the top wall and connected to a lower end of the partition wall; and a peripheral wall connecting the periphery of the top wall and the periphery of the bottom wall. The partition wall has an elongated shape in the direction orthogonal to both the direction connecting the top wall and the bottom wall and the thickness direction of the partition wall. The partition wall is provided with: a first wall located in a region including the center in the longitudinal direction of the partition wall; a second wall located on one side in the longitudinal direction; and a third wall located on the other side in the longitudinal direction. The thickness of the second wall and the thickness of the third wall are each set smaller than the thickness of the first wall.

In this pressure vessel, by reducing the thickness of the parts of the partition wall on which only a relatively small tensile load acts, the weight of the whole pressure vessel is reduced by material reduction while satisfying the required design requirements. Specifically, in this pressure vessel, compared to the first wall located in the region of the partition wall including the center in the longitudinal direction of the partition wall, on the parts of the partition wall near the peripheral wall, that is, on the second wall located on one side in the longitudinal direction of the partition wall and the third wall located on the other side thereof, only a small tensile load acts. Hence, the thickness of each of the second wall and the third wall can be made smaller than the thickness of the first wall in a range satisfying the required design requirements for the pressure vessel. Thereby, weight reduction of the pressure vessel due to the material reduction is achieved.

(6) The peripheral wall is provided with partition-wall facing parts facing the partition wall and having a shape which extends in the direction parallel to the longitudinal direction of the partition wall. The dimension in the longitudinal direction of the second wall may be less than one-half of the dimension between the partition wall and the partition-wall facing parts, and the dimension in the longitudinal direction of the third wall may be less than one-half of the dimension between the partition wall and the partition-wall facing parts.

In this mode, the dimension in the longitudinal direction of the first wall that is the part of the partition wall on which a relatively large tensile load acts is sufficiently secured, thereby satisfying the design requirements. Moreover, the thickness of the second wall and the third wall that are the parts of the partition wall on which only a relatively small tensile load acts can be made smaller than the thickness of the first wall respectively, so that even the weight reduction of the pressure vessel can be easily realized.

(7) Preferably, a surface of the first wall and a surface of the second wall are smoothly connected to each other, and the surface of the first wall and a surface of the third wall are smoothly connected to each other.

In this mode, the occurrence of stress concentration in the vicinity of the boundary of the first wall and the second wall and in the vicinity of the boundary of the first wall and the third wall is suppressed.

(8) Preferably, the thickness of the first wall is set so that the stress generated in the first wall by the tensile load in the lateral direction orthogonal to each of the longitudinal direction and the thickness direction of the partition wall acting on the first wall when the high pressure gas is received in the vessel main body is uniformly distributed in the first wall. In addition, preferably, the thickness of the second wall is set so that the stress generated in the second wall by the tensile load in the lateral direction acting on the second wall when the high pressure gas is received in the vessel main body is uniformly distributed in the second wall. Further, preferably, the thickness of the third wall is set so that the stress generated in the third wall by the tensile load in the lateral direction acting on the third wall when the high pressure gas is received in the vessel main body is uniformly distributed in the third wall.

In this mode, the thickness of each wall is set according to the distribution of the tensile load acting on each of the first wall, the second wall, and the third wall, that is, the thickness of each wall is optimized, so that unnecessary use of materials is eliminated, and the weight of the pressure vessel is further reduced.

(9) The top wall may be provided with: a top-wall main body connected to an upper end of the peripheral wall and the upper end of the partition wall; top-wall first-chamber-side ribs arranged in a standing condition on an outer surface on the first chamber side of the top-wall main body; and top-wall second-chamber-side ribs arranged in a standing condition on the outer surface on the second chamber side of the top-wall main body. The bottom wall may be provided with: a bottom-wall main body connected to a lower end of the peripheral wall and the lower end of the partition wall; bottom-wall first-chamber-side ribs arranged in a standing condition on an outer surface on the first chamber side of the bottom-wall main body; and bottom-wall second-chamber-side ribs arranged in a standing condition on the outer surface on the second chamber side of the bottom-wall main body. Preferably, the top-wall first-chamber side ribs and the top-wall second chamber-side ribs have a shape in which compared to the height dimension of the part arranged in a standing condition in a first region of the outer surface of the top-wall main body adjacent to the first wall in the thickness direction of the first wall, the height dimension of the parts arranged in a standing condition in second regions other than the first region of the outer surface of the top-wall main body is small. Preferably, the bottom-wall first-chamber side ribs and the bottom-wall second chamber-side ribs have a shape in which compared to the height dimension of the part arranged in a standing condition in a third region of the outer surface of the bottom-wall main body adjacent to the first wall in the thickness direction of the first wall, the height dimension of the parts arranged in a standing condition in fourth regions other than the third region of the outer surface of the bottom-wall main body is small.

In this mode, the height dimension of the ribs arranged in a standing condition in the part of the top-wall main body on which only a relatively small stress is generated, that is, in the second region other than the first region of the top-wall main body adjacent to the first wall in the thickness direction of the first wall is made smaller than the height dimension of the ribs arranged in a standing condition in the first region of the top-wall main body on which a relatively large stress is generated. Thereby, the strength of the top-wall main body can be improved while avoiding a significant weight increase. The same applies to the bottom-wall side too.

The invention claimed is:

1. A pressure vessel having a vessel main body for receiving high pressure gas and a partition wall formed in the vessel main body so as to divide the inside thereof in half into a first chamber and a second chamber, wherein the vessel main body is provided with: a top wall connected to an upper end of the partition wall; a bottom wall facing the top wall and connected to a lower end of the partition wall; and a peripheral wall connecting the periphery of the top wall and the periphery of the bottom wall, the top wall is provided with: a top-wall main body connected to an upper end of the peripheral wall and the upper end of the partition wall; a top-wall protruded part extending from the upper end of the partition wall to protrude externally from a part, located on a back side of a connection part of an inner surface of the top-wall main body and the upper end of the partition wall, of an outer surface of the top-wall main body; top-wall first-chamber-side ribs arranged in a standing condition on the outer surface on the first chamber of the top-wall main body; and top-wall second-chamber-side ribs arranged in a standing condition on the outer surface on the second chamber of the top-wall main body, the bottom wall is provided with: a bottom-wall main body connected to a lower end of the peripheral wall and the lower end of the partition wall; a bottom-wall protruded part extending from the lower end of the partition wall to protrude externally from a part, located on a back side of a connection part of an inner surface of the bottom-wall main body and the lower end of the partition wall, of an outer surface of the bottom-wall main body; bottom-wall first-chamber-side ribs arranged in a standing condition on the outer surface on the first chamber of the bottom-wall main body; and bottom-wall second-chamber-side ribs arranged in a standing condition on the outer surface on the second chamber of the bottom-wall main body, the top-wall first-chamber-side ribs and the top-wall second-chamber-side ribs each have a shape which connects with the top-wall protruded part, and the bottom-wall first-chamber-side ribs and the bottom-wall second-chamber-side ribs each have a shape which connects with the bottom-wall protruded part.

2. The pressure vessel according to claim 1, wherein
the top-wall first chamber-side ribs and the top-wall second-chamber-side ribs have a shape which connects with each other on the upper side of the top-wall protruded part and connects with a top surface of the top-wall protruded part.

3. The pressure vessel according to claim 1, wherein
the vessel main body further have upper-side reinforcing parts for reinforcing the boundaries of partition-wall facing parts facing the partition wall of the peripheral wall and the top-wall main body, and lower-side reinforcing parts for reinforcing the boundaries of the partition-wall facing parts and the bottom-wall main body.

4. The pressure vessel according to claim 1, wherein
the partition wall has an elongated shape in the direction orthogonal to both the direction connecting the top wall and the bottom wall and the thickness direction of the partition wall, the partition wall is provided with: a first wall located in a region including the center in the longitudinal direction of the partition wall; a second wall located on one side in the longitudinal direction; and a third wall located on the other side in the longitudinal direction, and the thickness of the second wall and the thickness of the third wall are each set smaller than the thickness of the first wall.

5. A pressure vessel having a vessel main body for receiving high pressure gas, and a partition wall formed in the vessel main body so as to divide the inside thereof in half into a first chamber and a second chamber, wherein the vessel main body is provided with: a top wall connected to an upper end of the partition wall; a bottom wall facing the top wall and connected to a lower end of the partition wall; and a peripheral wall connecting the periphery of the top wall and the periphery of the bottom wall, the partition wall has an elongated shape in the direction orthogonal to both the direction connecting the top wall and the bottom wall and the thickness direction of the partition wall, the partition wall is provided with: a first wall located in a region including the center in the longitudinal direction of the partition wall; a second wall located on one side in the longitudinal direction; and a third wall located on the other side in the longitudinal direction, and the thickness of the second wall and the thickness of the third wall are each set smaller than the thickness of the first wall.

6. The pressure vessel according to claim 5, wherein
the peripheral wall is provided with partition-wall facing parts facing the partition wall and having a shape extending in the direction parallel to the longitudinal direction of the partition wall, the dimension in the longitudinal direction of the second wall is less than one-half of the dimension between the partition wall and the partition-wall facing parts, and the dimension in the longitudinal direction of the third wall is less than one-half of the dimension between the partition wall and the partition-wall facing parts.

7. The pressure vessel according to claim 5, wherein
a surface of the first wall and a surface of the second wall are smoothly connected to each other, and the surface of the first wall and a surface of the third wall are smoothly connected to each other.

8. The pressure vessel according to claim 5, wherein
the thickness of the first wall is set so that the stress generated in the first wall by the tensile load in the lateral direction orthogonal to each of the longitudinal direction and the thickness direction of the partition wall acting on the first wall when high pressure gas is received in the vessel main body is uniformly distributed in the first wall, the thickness of the second wall is set so that the stress generated in the second wall by the tensile load in the lateral direction acting on the second wall when high pressure gas is received in the vessel main body is uniformly distributed in the second wall, and the thickness of the third wall is set so that the stress generated in the third wall by the tensile load in the lateral direction acting on the third wall when high pressure gas is received in the vessel main body is uniformly distributed in the third wall.

9. The pressure vessel according to claim 5, wherein
the top wall is provided with: a top-wall main body connected to an upper end of the peripheral wall and the upper end of the partition wall; top-wall first-chamber-side ribs arranged in a standing condition on an outer surface on the first chamber side of the top-wall main body; and top-wall second-chamber-side ribs arranged in a standing condition on the outer surface on the second chamber side of the top-wall main body, the bottom wall is provided with: a bottom-wall main body connected to a lower end of the peripheral wall and the lower end of the partition wall; bottom-wall first-chamber-side ribs arranged in a standing condition on an outer surface on the first chamber side of the bottom-wall main body; and bottom-wall secondchamber-side ribs arranged in a standing condition on the outer surface on the second chamber side of the bottom-wall main body, the top-wall first-chamber side ribs and the top-wall second chamber-side ribs have a shape in which compared to the height dimension of the part arranged in a standing condition in a first region of the outer surface of the top-wall main body adjacent to the first wall in the thickness direction of the first wall, the height dimension of the parts arranged in a standing condition in second regions other than the first region of the outer surface of the top-wall main body is small, and the bottom-wall first-chamber side ribs and the bottom-wall second chamber-side ribs have a shape in which compared to the height dimension of the part arranged in a standing condition in a third region of the outer surface of the bottom-wall main body adjacent to the first wall in the thickness direction of the first wall, the height dimension of the parts arranged in a standing condition in fourth regions other than the third region of the outer surface of the bottom-wall main body is small.

* * * * *